(12) United States Patent
Kim et al.

(10) Patent No.: US 7,545,440 B2
(45) Date of Patent: Jun. 9, 2009

(54) DIGITAL MULTIMEDIA BROADCASTING RECEIVER, AND METHOD OF USING ADDITIONAL INFORMATION THEREOF

(75) Inventors: Jun Kim, Seoul (KR); Sang O Park, Seoul (KR)

(73) Assignee: LG Electronics Inc., Seoul (KR)

( * ) Notice: Subject to any disclaimer, the term of this patent is extended or adjusted under 35 U.S.C. 154(b) by 538 days.

(21) Appl. No.: 10/941,971

(22) Filed: Sep. 16, 2004

(65) Prior Publication Data

US 2005/0060744 A1    Mar. 17, 2005

(30) Foreign Application Priority Data

Sep. 17, 2003    (KR) .................. 10-2003-0064425

(51) Int. Cl.
*H04N 5/445*    (2006.01)

(52) U.S. Cl. .................. 348/563; 348/461; 348/465; 455/566

(58) Field of Classification Search ......... 348/563–570, 348/461, 465, 466, 467, 468; 700/90; 455/566; 725/99, 100, 40, 44, 45, 37
See application file for complete search history.

(56) References Cited

U.S. PATENT DOCUMENTS

| | | | | |
|---|---|---|---|---|
| 5,699,106 A | * | 12/1997 | Matsubara et al. | ............ 725/54 |
| 6,128,009 A | * | 10/2000 | Ohkura et al. | ................ 725/46 |
| 6,400,890 B1 | * | 6/2002 | Nagasaka et al. | ............. 386/69 |
| 6,424,380 B1 | * | 7/2002 | Osaka | ........................ 348/553 |
| 7,031,781 B1 | * | 4/2006 | Hamada et al. | ................ 700/94 |

FOREIGN PATENT DOCUMENTS

| | | |
|---|---|---|
| CN | 1441599 A | 9/2003 |
| EP | 1220479 A2 | 7/2002 |

* cited by examiner

*Primary Examiner*—M. Lee
(74) *Attorney, Agent, or Firm*—Birch, Stewart, Kolasch & Birch, LLP (57) ABSTRACT

A method of using additional information at a DMB (Digital Multimedia Broadcasting) receiver is provided. The method includes the steps of: extracting and displaying additional information from a DMB signal; selecting and storing a desired one of the displayed additional information; displaying a list of the stored additional information depending on a user's request command; and outputting additional information selected at the list of the additional information.

18 Claims, 9 Drawing Sheets

DAB Audio frame

DIGITAL MULTIMEDIA BROADCASTING RECEIVER, AND METHOD OF USING ADDITIONAL INFORMATION THEREOF

This Non-provisional application claims priority under 35 U.S.C. §119(a) on Patent Application Ser. No(s). 10-2003-0064425 filed in Korea, Republic of on Sep. 17, 2003, the entire contents of which are hereby incorporated by reference.

BACKGROUND OF THE INVENTION

1. Field of the Invention

The present invention relates to a method of using additional information at a Digital Multimedia Broadcasting (DMB) receiver, and more particularly, to a method of displaying, storing and using additional information besides audio or video data received through a DMB receiver.

2. Description of the Related Art

Digital Multimedia Broadcasting (DMB) is an international standard for a mobile reception of a multimedia. In this standard, a broadcasting-reception and data-transmission method is based on a standard of Digital Audio Broadcasting (DAB), and Moving Picture Experts Group (MPEG)-4 data is transmitted for a video broadcasting.

A conventional television set or radio performs a reproduction function through a separate receiving unit. However, it is possible for a DMB receiver to receive and reproduce a variety of additional information as well as audio data or video data in a television service or a radio service.

The DMB receiver cannot only receive broadcasting contents, but also can store the received broadcasting contents or provide the stored broadcasting contents to a user. At this time, the DMB receiver is most limited in memory.

Especially, since the video data occupies many memory capacities, it is impossible in reality to store a variety of video data in a limited memory of the DMB receiver.

To the contrary, since additional information can provide useful information to the user with a small memory capacity, a method is being studied for easily storing desired additional information and effectively providing the stored additional information to the user.

SUMMARY OF THE INVENTION

Accordingly, the present invention is directed to a digital multimedia broadcasting receiver and a method of using additional information that substantially obviate one or more problems due to limitations and disadvantages of the related art.

An object of the present invention is to provide a method of selectively receiving and easily storing additional information occupying a less memory.

Another object of the present invention is to provide a method of reconstructing stored additional information through various methods to provide the reconstructed additional information to a user.

A further object of the present invention is to provide a method of selectively receiving or storing broadcasting contents by using stored additional information.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a method of using additional information at a DMB (Digital Multimedia Broadcasting) receiver, the method including the steps of: extracting and displaying additional information from a DMB signal; selecting and storing a desired one of the displayed additional information; displaying a list of the stored additional information depending on a user's request command; and outputting additional information selected at the list of the additional information.

In another aspect of the present invention, there is provided a method of using additional information at a DMB (Digital Multimedia Broadcasting) receiver, the method including the steps of: extracting and displaying additional information from a DMB signal; storing a desired one of the displayed additional information and a feature element describing a feature of the desired additional information; automatically extracting additional information corresponding to the feature element, from a received DMB signal; and displaying or storing the extracted additional information.

In a further aspect of the present invention, there is provided a method of using additional information at a DMB (Digital Multimedia Broadcasting) receiver, the method including the steps of: setting a feature element of desired additional information; extracting additional information from received DMB data; and comparing the set feature element with a feature element of the extracted additional information to display the extracted additional information having the feature element consistent with the set feature element.

In a still another aspect of the present invention, there is provided a DMB (Digital Multimedia Broadcasting) receiver including: a DAB (Digital Audio Broadcasting) decoder for decoding a DAB signal in a received digital multimedia broadcasting signal to extract additional information; a channel decoder and a MPEG (Moving Picture Experts Group)-4 decoder for decoding MPEG-4 data; a speaker for outputting an audio signal; a display unit for displaying a video signal; a controller for allowing the extracted additional information to be stored or displayed depending on a feature element; a memory for storing the additional information and the feature element; and a user interface for inputting a user's control command.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Digital Multimedia Broadcasting (DMB) receiver according to the present invention extracts and displays additional information from received broadcasting information, and the additional information is stored together with a feature element describing a feature of the additional information.

The feature element can be used as a basis for selecting and arranging the additional information in received broadcasting, and can allow an automatic extraction and storage of the additional information.

Figure 1:
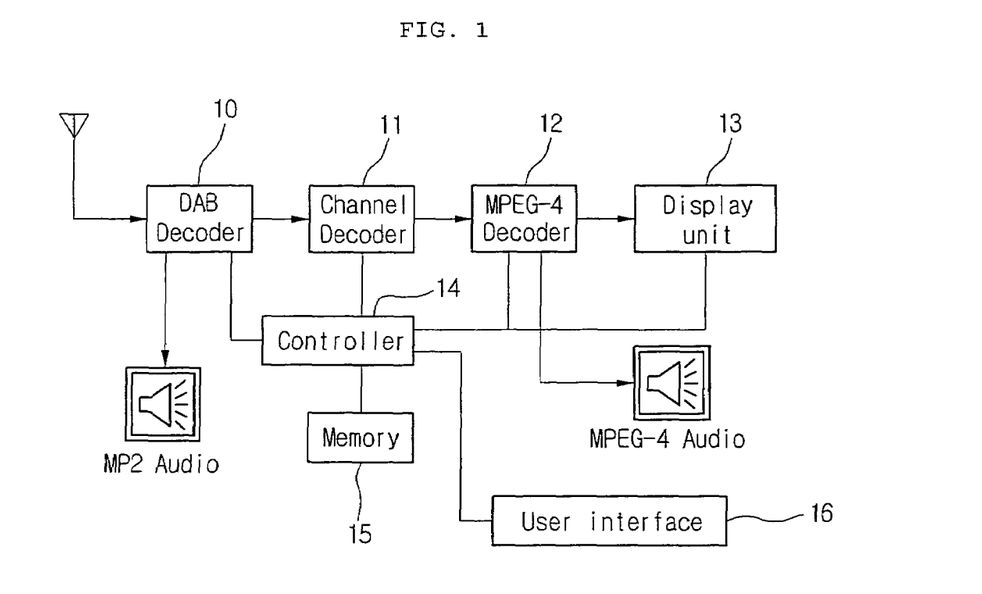
FIG. 1 is a view illustrating a construction of a Digital Multimedia Broadcasting (DMB) receiver according to the present invention.

FIG. 1 is a view illustrating a construction of the Digital Multimedia Broadcasting (DMB) receiver according to the present invention.

Referring to FIG. 1, the DMB receiver includes a DAB decoder 10 for receiving a DAB signal through an antenna to decode the received DAB signal; a channel decoder 11 and a Moving Picture Experts Group (MPEG)-4 decoder 12 for decoding MPEG-4 data; a speaker for outputting an audio signal; a display unit 13 for outputting a video signal; a controller 14 for controlling the DAB decoder 10, the channel decoder 11, the MPEG-4 decoder 12, the speaker and the display unit 13; a memory 15 for storing predetermined data; and a user interface 16 for inputting a control command to the controller 14.

Figure 2:
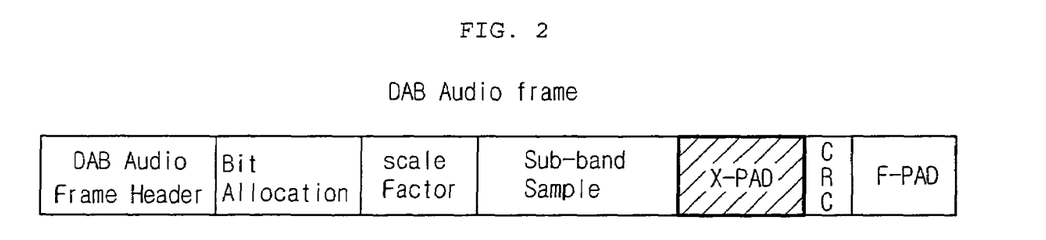
FIG. 2 is a view illustrating a structure of a Digital Audio Broadcasting (DAB) audio frame.
Figure 3:
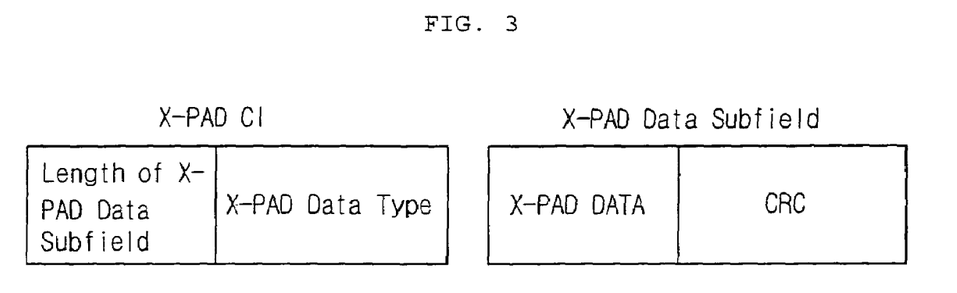
FIG. 3 is a view illustrating a structure of an Extended Program Associated Data (X-PAD)

Additional information besides the video signal or the audio signal is included in Extended Program Associated Data (X-PAD) of a Digital Audio Broadcasting (DAB) audio frame shown in FIG. 2. As shown in FIG. 3, the X-PAD is comprised of an X-PAD Contents Indicator (CI) for identifying a kind of data transmitted by the X-PAD; and an X-PAD Subfield at which actual data is included.

The DAB decoder 10 extracts the additional information from the X-PAD of a digital multimedia broadcasting signal and the controller 14 interprets the X-PAD CI included in the X-PAD to identify a kind of data and show actual additional information, which is provided at the X-PAD data Subfield, to a user.

The user can store the displayed additional information through the user interface 16. At this time, the controller 14 store the feature element describing the feature of the additional information, together with the additional information, in the memory 15.

A list of the stored additional information can be classified and displayed on the basis of the feature element depending on a user's request inputted through the user interface 16. The selected additional information is displayed through the display unit 13.

Here, the feature element can be directly inputted through the user interface 16, and can be transmitted and stored together with the additional information.

Figure 4:
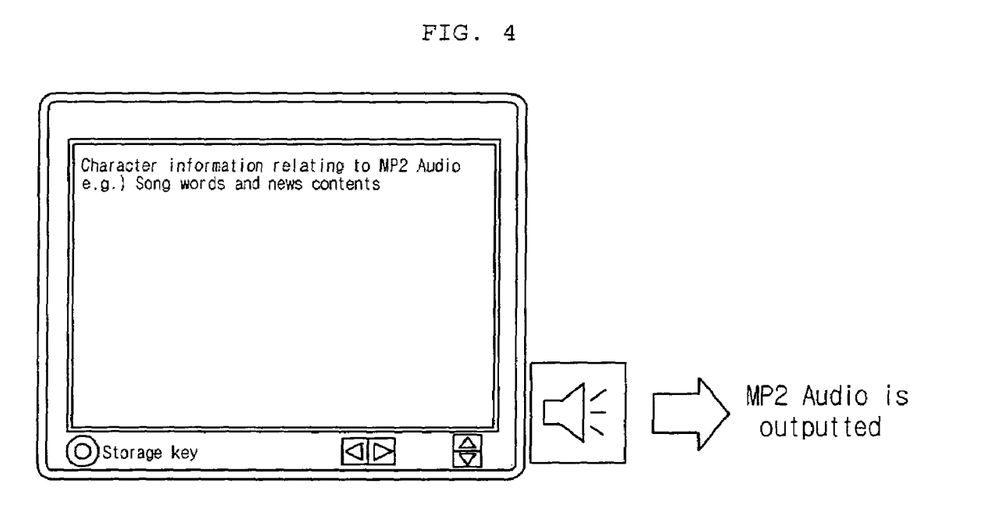
FIG. 4 is a display view of data included in a Dynamic Lable, among extracted data.
Figure 5:
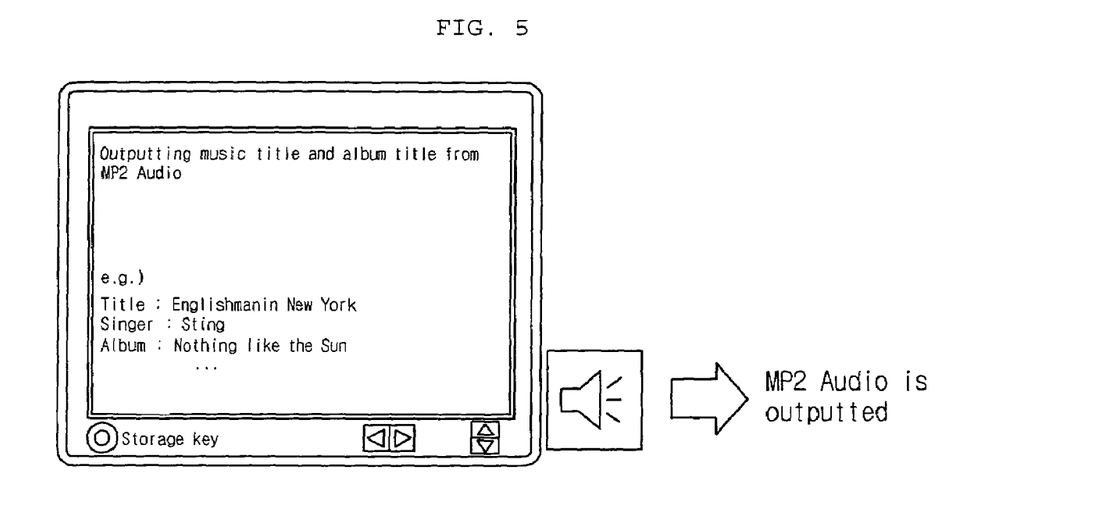
FIG. 5 is a display view of data included in an Interactive Text Transmission System (ITTS), among extracted data.
Figure 6:
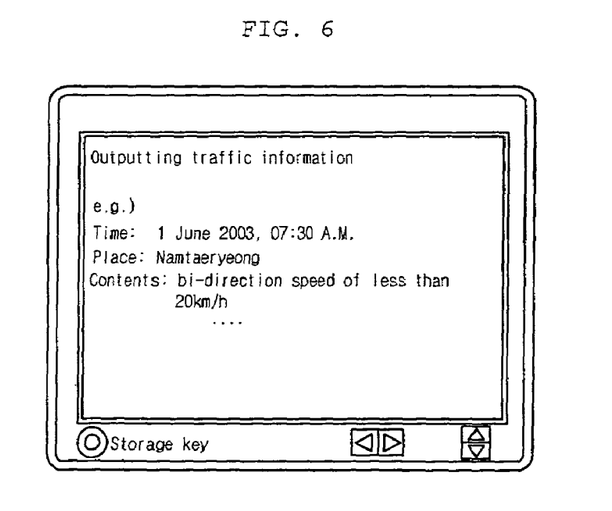
FIG. 6 is a display view of data included in a Transparent Data Channel (TDC), among extracted data.

FIGS. 4 to 6 are views illustrating examples of additional information, which can be transmitted depending on a standard.

FIG. 4 is a display view of data included in a Dynamic Lable, among extracted data. The display view includes character information relating to received DAB audio data.

FIG. 5 is a display view of data included in an Interactive Text Transmission System (ITTS), among the extracted data. The display view includes a music title, an album title and the like of the received DAB audio data.

FIG. 6 is a display view of data included in a Transparent Data Channel (TDC), among the extracted data. The display view mainly includes traffic information and the like.

Figure 7:
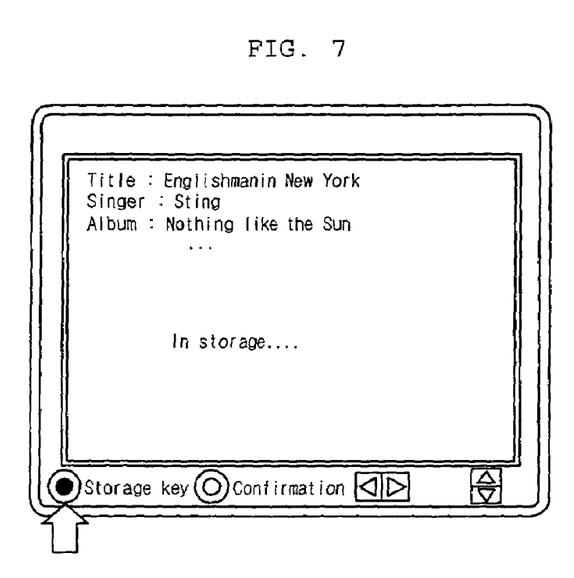
FIG. 7 is a storage view of desired additional information.

If a variety of additional information is displayed as described above, the user stores desired additional information in the memory 15 through a storage key of the user interface as shown in FIG. 7 while viewing corresponding additional information.

When the additional information is stored, at least one feature element such as a storage time, a title, and a media kind is stored together with actual data in the memory. Here, the storage time, the title and the media kind are the feature elements describing the features of the corresponding additional information, and can be used as the bases on which the stored additional information are selected or arranged.

At this time, the feature element can be the data extracted from the X-PAD Contents Indicator.

Figure 8:
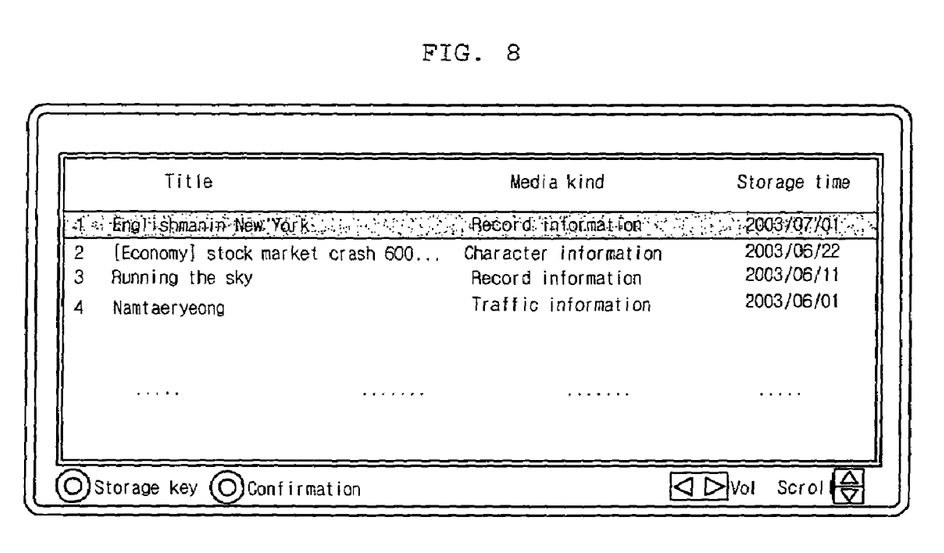
FIG. 8 is a selection view of stored additional information.

As shown in FIG. 8, the list of the stored additional information can be arranged depending on the storage time, the title and the media kind, which are stored together with the actual data. The user can scroll by using a direction key of the user interface to select a desired service.

Figure 9:
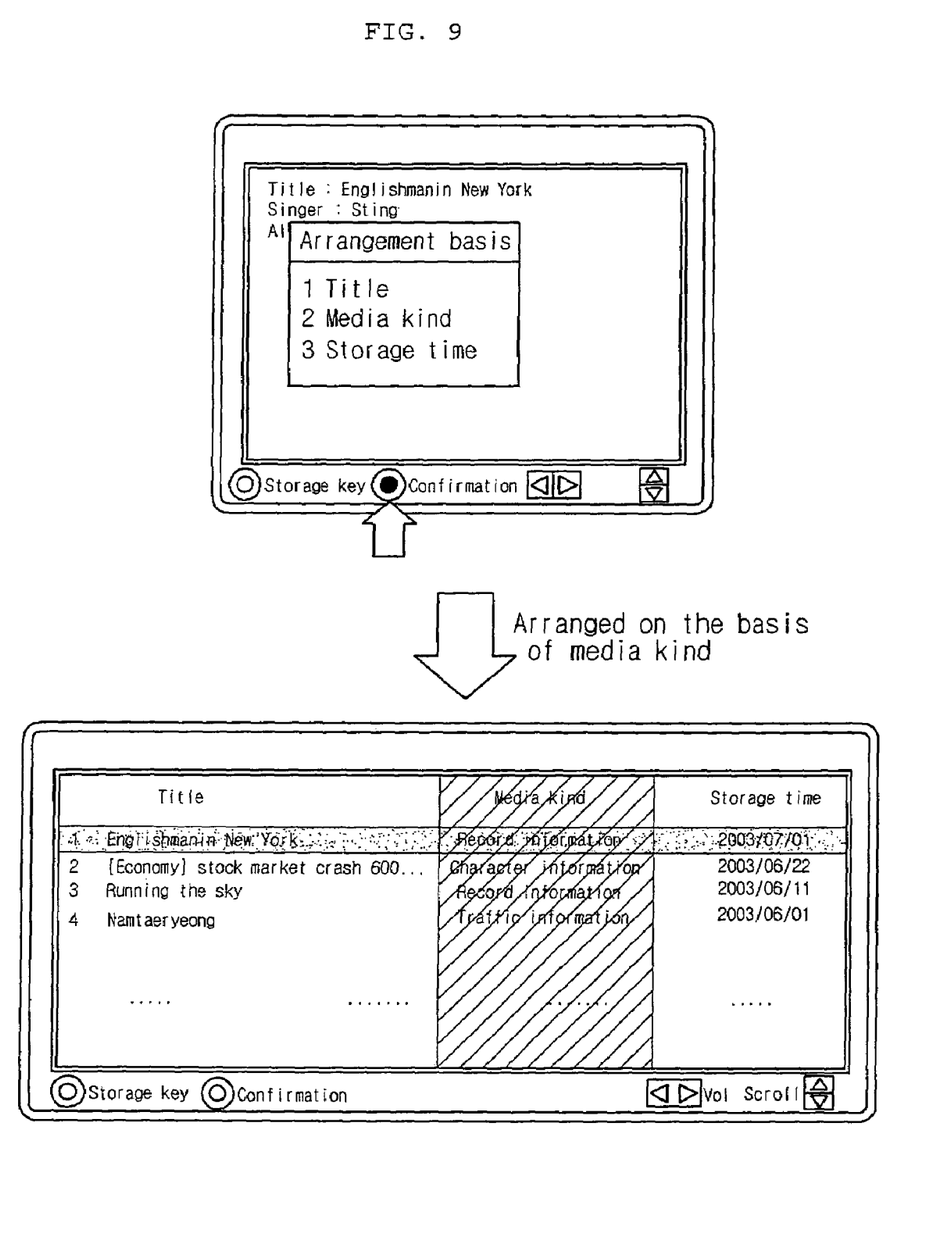
FIG. 9 is an arrangement view of a list based on a feature element of additional information.

As shown in FIG. 9, the additional information can be arranged depending on a user's desired feature element (media kind).

Figure 10:
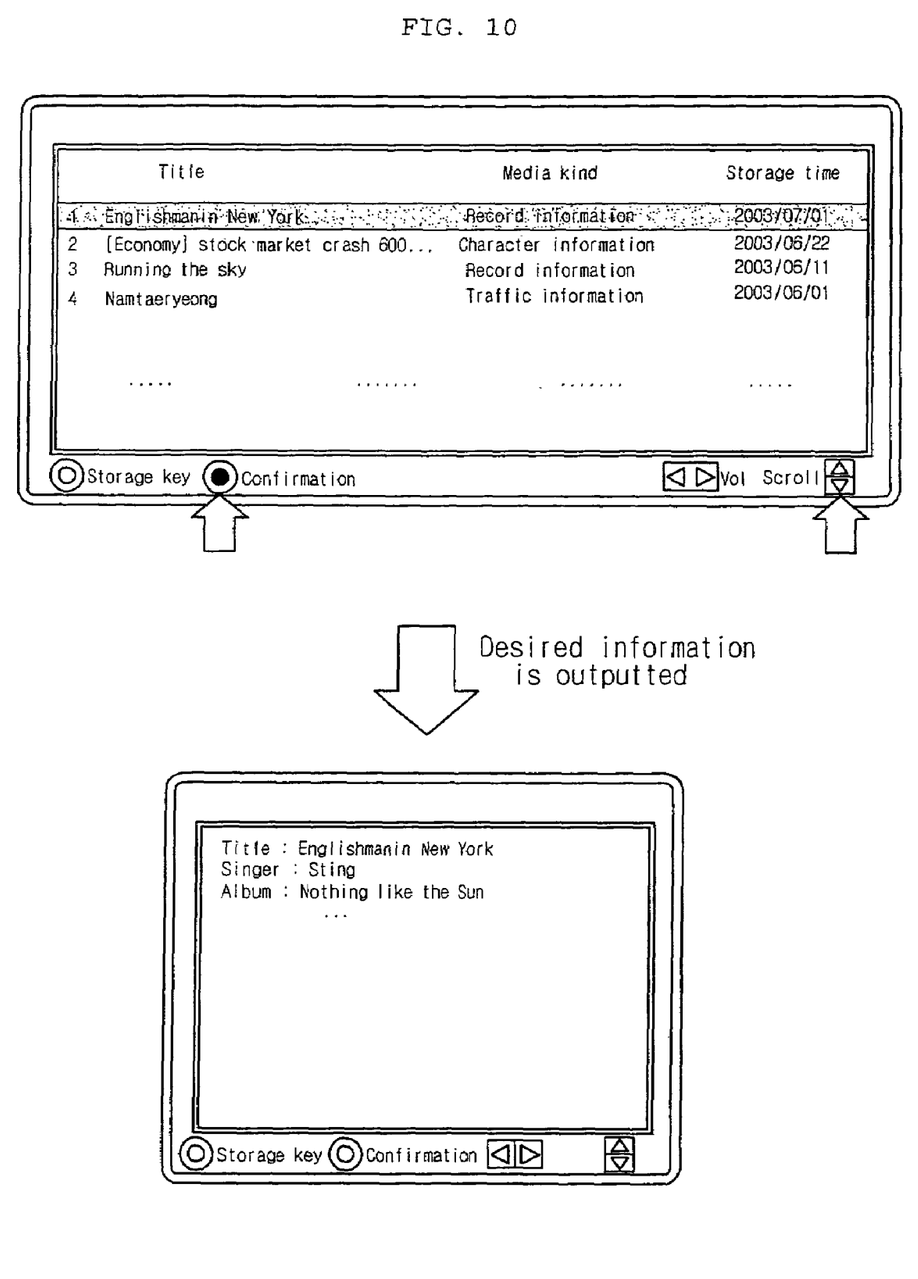
FIG. 10 is a selection and output view of desired additional information.

If the user selects his/her desired one of the arranged additional information by using the direction key and a confirmation key of the user interface, the selected additional information is outputted through the display unit as shown in FIG. 10.

Further, the stored additional information can be used as the bases on which the desired additional information can be selectively extracted from data received through the DMB receiver.

For example, the feature element describing the feature of the additional information is stored, such as the title or the media kind, together with the actual data in the memory, and the same additional information as the tile or the media kind is automatically stored in the memory. Accordingly, the additional information of a particular concerned field can be selectively extracted or stored.

Figure 11:
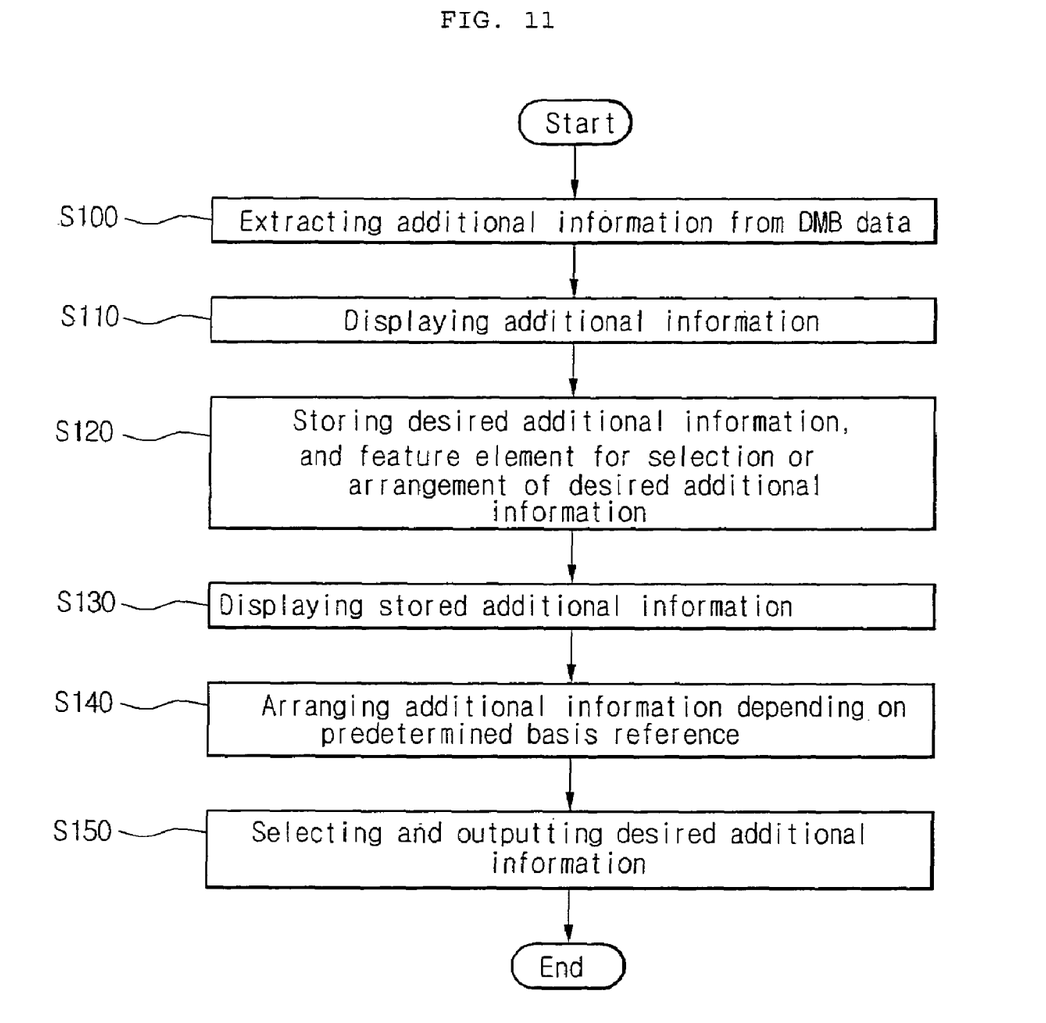
FIG. 11 is a flowchart illustrating a method of using additional information at a digital multimedia broadcasting receiver according to one embodiment of the present invention.

FIG. 11 is a flowchart illustrating a method of using the additional information at the DMB receiver according to one embodiment of the present invention.

First, the additional information is extracted from DMB data and displayed through the display unit (S100) (S110).

In case where the desired one of the displayed additional information is displayed, the desired additional information is stored through the user interface. At this time, the additional information is stored together with a basis element for arranging the stored additional information, or the feature element for allowing the same or similar additional information with the additional information to be automatically selected and stored depending on a user's concern. The feature element can describe the feature of the additional information, and can be provided in variety (S120).

If the user searches for the stored additional information to output the desired additional information in the future, the list of the stored additional information is displayed. At this time, the stored additional information can be classified and arranged on the basis of the feature element stored together with the additional information (S130)(S140).

If the user selects the desired one of the arranged additional information through the user interface, the selected additional information is outputted (S150).

Figure 12:
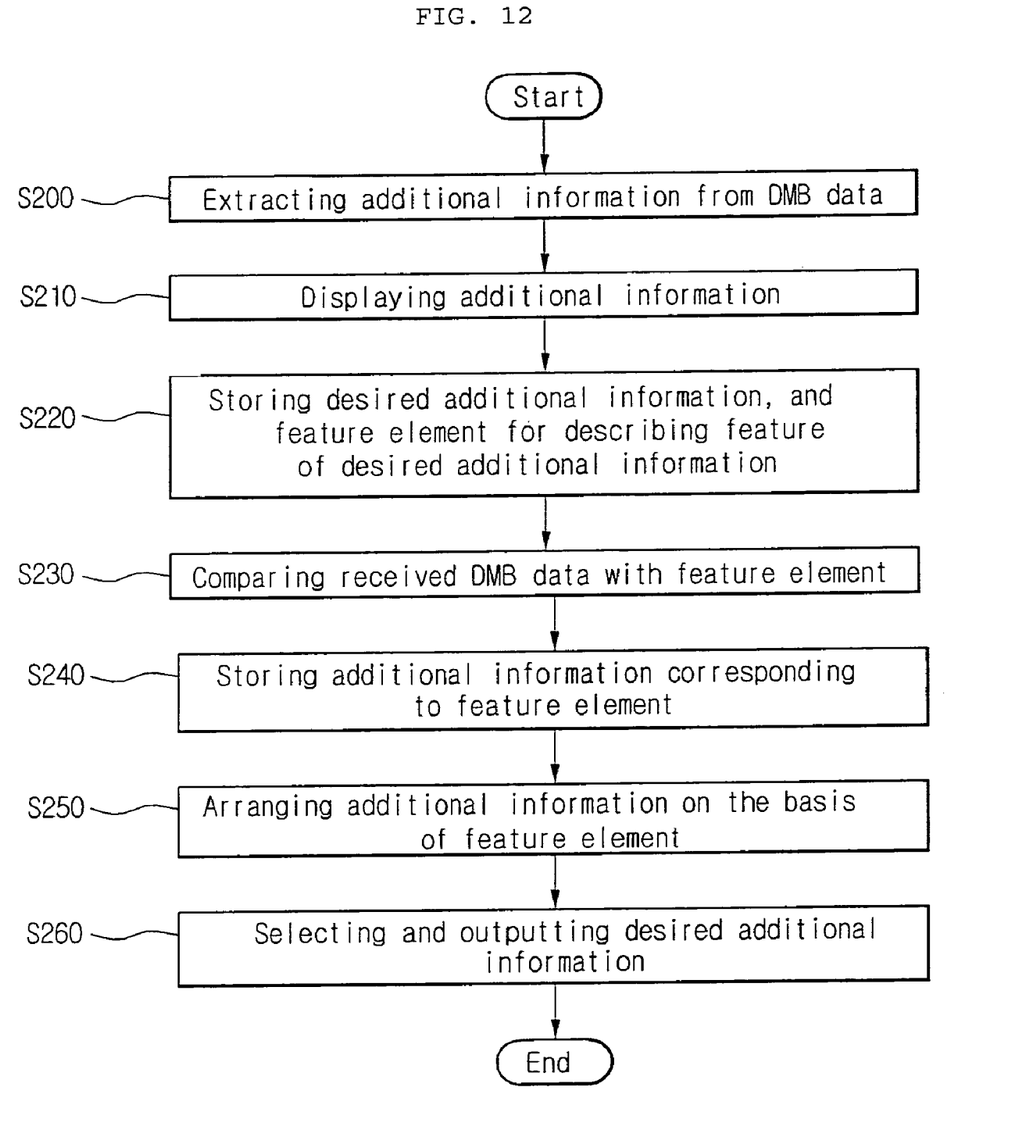
FIG. 12 is a flowchart illustrating a method of using additional information at a digital multimedia broadcasting receiver according to another embodiment of the present invention.

FIG. 12 is a flowchart illustrating a method of using additional information at a DMB receiver according to another embodiment of the present invention.

First, additional information is extracted from DMB data and displayed through a display unit (S200)(S210).

In case where the desired one of the displayed additional information is displayed, the displayed additional information is stored through the user interface. At this time, the additional information is stored together with the feature element describing the feature of the stored additional information. The feature element can describe the feature of the additional information, and can be provided in variety (S220).

In case where a user desires to store or display additional information having the same feature element as specific stored additional information, a controller compares the received DMB data with the stored feature element to automatically select the additional information corresponding to the feature element, thereby storing or displaying the selected additional information. For example, in case where the user stores the feature element such as "traffic information", the additional information relating to the "traffic information" is automatically selected (S230) (S240).

Further, in case where the user searches for specific additional information, the list of the additional information is displayed on the basis of the specific additional information. At this time, the stored additional information can be classified and arranged on the basis of the feature element stored together with the additional information (S250).

If the user selects the desired one of the arranged additional information through the user interface, the corresponding additional information is outputted (S260).

According to the embodiment of FIG. 12, the user can selectively store or display the additional information having the same feature element as the specific stored additional information. Therefore, the additional information having similar contents can be easily stored or displayed.

Figure 13:
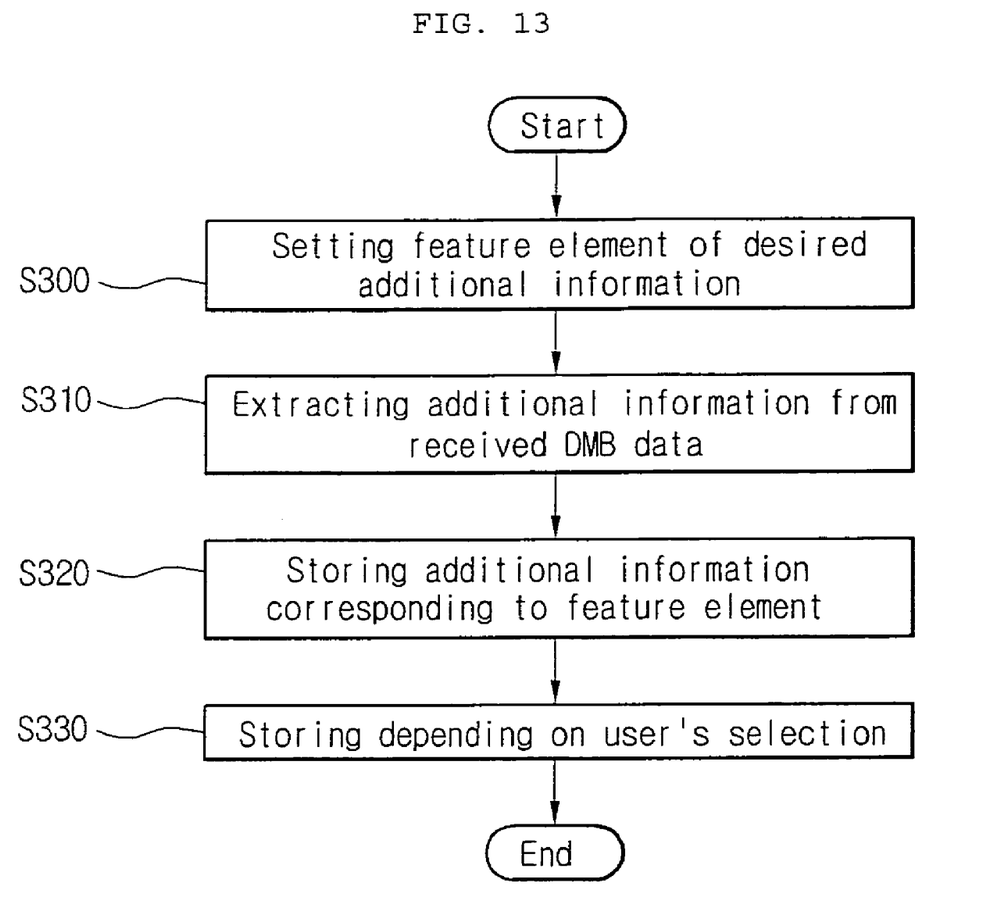
FIG. 13 is a flowchart illustrating a method of using additional information at a digital multimedia broadcasting receiver according to a further embodiment of the present invention.

FIG. 13 is a flowchart illustrating a method of using additional information at a DMB receiver according to a further embodiment of the present invention.

First, a user sets a feature element of desired additional information. For example, the feature element such as "news" can be set (S300).

The controller extracts the additional information from received DMB data depending on user's setting, and compares the feature element of the additional information with the feature element set by the user (S310).

Additionally, in case where the additional information having the feature element set by the user is received, the received additional information is displayed (S320).

Additionally, the additional information displayed depending on user's selection is stored in the memory (S330).

The embodiment of FIG. 13 has an advantage in that only user's desired one of so many pieces of additional information is displayed, thereby allowing the user to selectively view the desired information.

The present invention has an advantage in that the additional information less occupying the memory can be selectively stored.

Further, the present invention has an advantage in that the stored additional information is reconstructed using various methods to be provided to the user.

Furthermore, the present invention has an advantage in that the stored additional information is used to selectively receive or store broadcasting contents.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of using additional information at a digital multimedia broadcasting receiver, the method comprising the steps of:
   extracting and displaying additional information from a digital multimedia broadcasting signal;
   selecting and storing a desired one of the displayed additional information;
   displaying a list of the stored additional information depending on a user's request command; and
   outputting additional information selected at the list of the additional information.

2. The method according to claim 1, wherein in the selecting and storing of the desired additional information, the selected additional information is stored together with a feature element describing a feature of the selected additional information.

3. The method according to claim 1, wherein the list of the additional information is arranged and displayed on the basis of a user's selected one of the feature elements describing the features of the additional information.

4. The method according to claim 2, wherein the feature element is the basis on which corresponding additional information is selected or arranged.

5. The method according to claim 2, wherein the feature element is at least one of a storage time, a title, and a media kind of the corresponding additional information.

6. The method according to claim 2, wherein the feature element is extracted from an X-PAD (Extended Program Associated Data) Contents Indicator located in a DAB (Digital Audio Broadcasting) audio frame of the received digital multimedia broadcasting signal.

7. A method of using additional information at a digital multimedia broadcasting receiver, the method comprising the steps of:
   extracting and displaying additional information from a digital multimedia broadcasting signal;

storing a desired one of the displayed additional information and a feature element describing a feature of the desired additional information;

automatically extracting additional information corresponding to the feature element, from a received digital multimedia broadcasting signal; and displaying or storing the extracted additional information.

8. The method according to claim 7, further comprising the step of:

arranging and displaying the extracted and stored additional information by the feature element selected by a user.

9. The method according to claim 7, wherein the feature element is a title or a media kind of the additional information.

10. A method of using additional information at a digital multimedia broadcasting receiver, the method comprising the steps of:

setting a feature element of desired additional information;

extracting additional information from received digital multimedia broadcasting data; and comparing the set feature element with a feature element of the extracted additional information to display the extracted additional information having the feature element consistent with the set feature element.

11. The method according to claim 10, further comprising the step of:

storing the displayed additional information depending on a user selection.

12. The method according to claim 10, wherein the feature element is at least one of a title and a media kind.

13. The method according to claim 10, wherein the feature element is extracted from an X-PAD (Extended Program Associated Data) contents indicator located in a DAB (Digital Audio Broadcasting) audio frame of a received digital multimedia broadcasting signal.

14. A digital multimedia broadcasting receiver comprising:

a DAB (Digital Audio Broadcasting) decoder for decoding a DAB signal in a received digital multimedia broadcasting signal to extract additional information;

a channel decoder and a MPEG (Moving Picture Experts Group)-4 decoder for decoding MPEG-4 data;

a speaker for outputting an audio signal;

a display unit for displaying a video signal;

a controller for allowing the extracted additional information to be selectively stored or displayed depending on a feature element;

a memory for storing the additional information corresponding to the feature element; and a user interface for inputting a user's control command.

15. The receiver according to claim 14, wherein the feature element is inputted by a user through the user interface.

16. The receiver according to claim 14, wherein the feature element is received together with the additional information.

17. The receiver according to claim 14, wherein the feature element is at least one of a storage time, a title and a media kind.

18. The receiver according to claim 14, wherein the controller selectively stores or displays the additional information having the same feature element as a set feature element.

* * * * *